June 21, 1927.

H. P. HENDRICKSON

BUNCH RAKE

Filed Aug. 6, 1925

INVENTOR
Henry P. Hendrickson
BY M. C. Frank
ATTORNEY

June 21, 1927.　　　H. P. HENDRICKSON　　　1,633,017
BUNCH RAKE
Filed Aug. 6, 1925　　　2 Sheets-Sheet 2

INVENTOR
Henry P. Hendrickson
By M. C. Frank
ATTORNEY

Patented June 21, 1927.

1,633,017

UNITED STATES PATENT OFFICE.

HENRY P. HENDRICKSON, OF SANTA RITA, CALIFORNIA, ASSIGNOR, BY DIRECT AND MESNE ASSIGNMENTS, OF FORTY PER CENT TO JOSEPH L. DEL MONTE AND TEN PER CENT TO M. C. FRANK, BOTH OF OAKLAND, CALIFORNIA.

BUNCH RAKE.

Application filed August 6, 1925. Serial No. 48,502.

My invention relates to rakes adapted for bunching hay, alfalfa, clover, and the like, and it has special reference to means whereby the bunching is accomplished by a single operator.

Hitherto, the manual operation of bunch rakes has been exceedingly difficult because of the strength required to lift the rake to the dumping position, a bunch of hay gathered in the rake sometimes weighing as much as 400 lbs. and seldom, if ever, less than 300 lbs. Thus, the stress and strain on the operators of bunch rakes hitherto known has been so great that only the strongest men have been able to endure a day's work of this kind.

In order to accomplish the work with manually operated rakes it has therefore often been the practice to place two men in charge of each rake. One man then drives the rake while the other man in operating the rake is free to use both hands as it may be necessary. It has therefore long been the desire of farm and ranch owners or others, interested in agricultural work either from a commercial or a humanitarian standpoint, that a bunch rake might be produced in which the operation would be easy, so that even men of moderate strength could accomplish a full day's work therewith without being exhausted.

Other defects in the construction of such rakes also combine to make the operation of the rakes still more difficult and unsatisfactory. For instance, when the operator has completed the bunching in one windrow and, with the rake in the dumping position, moves the rake to another windrow, if the ground is uneven, or when the ground wheels of the rake encounter rocks or stones, the jar of the mechanism causes the rake to swing forward to a position where it fails to respond to the pull on the manually operated lever. The rake itself being heavy, the operator then has serious trouble in swinging the rake back into position for manipulation. In order to avoid this it has been necessary up to this time to tie the rake in dumping position, such a procedure necessarily causing annoyance and much loss of time.

One object of my invention is to provide a rake with foot-operated means for lowering the rake to raking position and for raising the rake to dumping position.

Another object of my invention is to provide a rake with means for positively locking the rake either in the raking position or in the dumping position.

A still further object is to make the operation of a rake so easy that persons of only moderate strength may be able to perform a full day's work with the rake without being weakened or exhausted as a result thereof.

Other objects and advantages will appear as the invention is gradually unfolded in the following description, which is fully illustrated in the accompanying drawings.

In the drawings, Figure 1 is a side elevation of a bunch rake equipped with my foot-operated means for lowering or raising the rake and for locking the rake in lowered or raised position, the view being partly sectional and partly broken, and the rake being shown as locked in the raking position;

Figure 2:
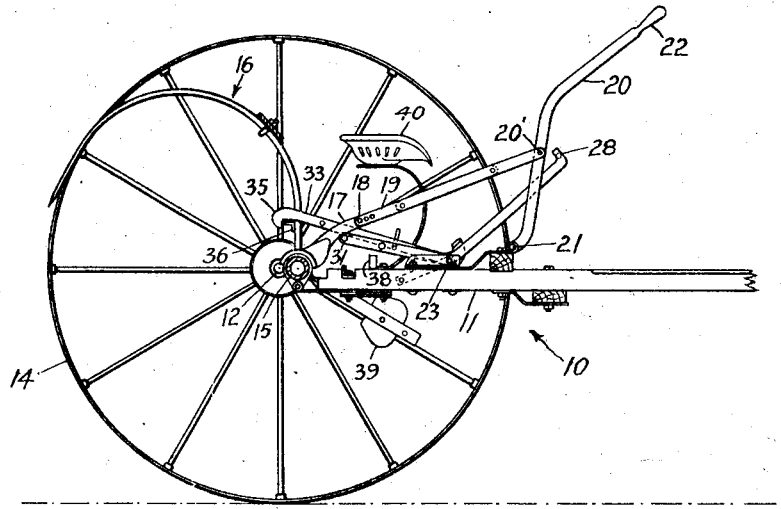
Fig. 2 is a side elevation similar to Fig. 1 but showing the rake held and locked in the dumping position.

For convenience of illustration I show in the drawings only partly a conventional type of a bunch rake 10 having a frame-work 11 and an axle 12 supported in the usual manner by ground wheels 14 and being provided with a head 15, which is pivotally mounted on the axle and has fixed thereto a plurality of curved teeth members forming the rake 16. With a lateral extension 17 of the head 15 is pivotally connected, as at 18, one end of a member 19, which is preferably made in two sections suitably spaced apart so as to allow the free working therebetween of the extension 17 and of another member, comprising a lever 20 pivotally connected between its ends as at 20' with the other end of the member 19, the lever 20 having at a suitable point forward of the head 15 one end pivotally connected with the frame 11, as at 21, and being at its other end provided with a handle 22 by means of which the rake may be operated in the usual manner.

In order to operate the rake by foot power I also connect with the frame 11 and in pivotal relation thereto, as at 23, rearward of the pivotal connection 21 of the hand lever 20, another lever 24 by suitable means, such as an angle-iron 25 rigidly secured to the frame. The lever 24, being of the bell-crank type, comprises two arms 26 and 27 of which the arm 26 extends forward and terminates upwardly in a lateral projection 28 serving as a foothold for the operator, a lug 29 on the projection preventing the foot of the operator from slipping out of engagement with the arm 26 during the operation of the rake. The other arm 27 of the foot lever 24 extends rearward and has thereon two laterally protruding pins 30 and 31 for the purpose of engaging the members 20 and 19 in a manner hereinafter set forth. Extending laterally from the arm 27 on the side opposite to the pins 30 and 31 is fixed a member 32, preferably hook-shaped; and in pivotal relation to the frame and co-pivotal with the foot-lever 24 is attached a lock bar 33, which is engaged by the member 32 when the bell-crank arm 27 is initially swung upwardly, and is stopped by the engagement of a laterally projecting lug 34 on the lock bar with the arm 26 of the foot-lever 24 when the lock bar is swung upward, so as to limit the bar's upward movement. The free end of the bar 33 is hook-shaped, as shown at 35, in order to adapt the bar for engagement with a stop member 36, which may be an angle-piece or otherwise suitably formed and is firmly fixed to the rake 16 by suitable means, the engagement of the member 36 with the hook 35 thus serving to hold the rake locked when the rake is raised to the dumping position. By means of a pin 37 laterally extended from the lock bar 33, the bar is further adapted to be engaged by the member 19 and lifted thereby when the rake is swung upward, so as to enable the bar to lock the rake in the dumping position.

Figure 1:
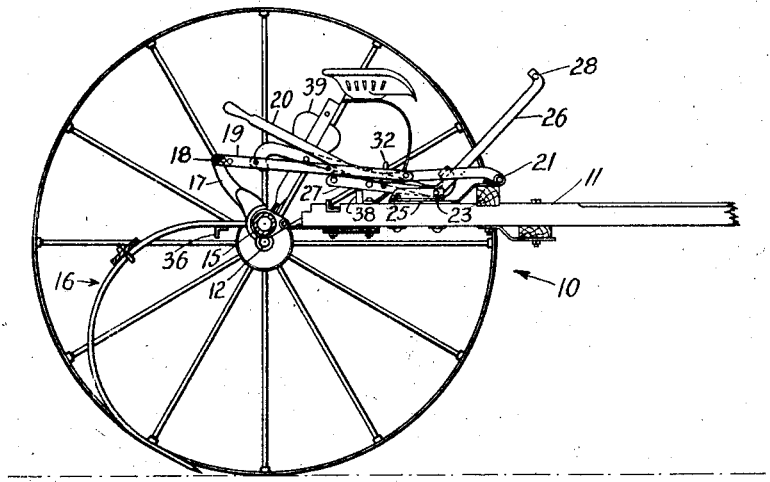
Figure 3:
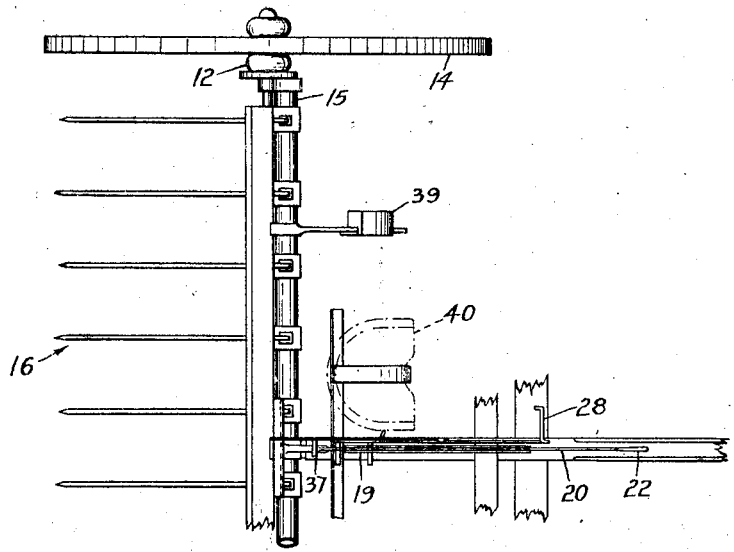
Fig. 3 is a broken plan of the rake in the position shown in Fig. 2.
Figure 4:
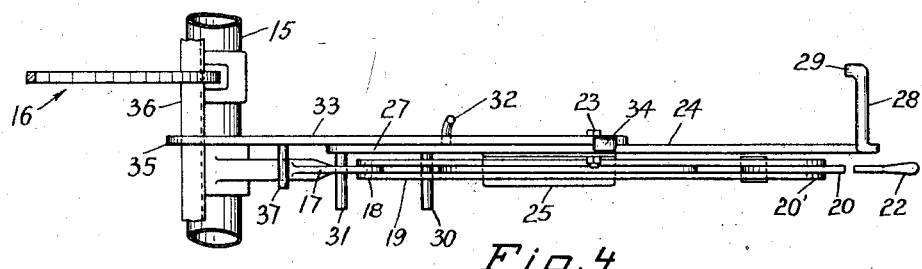
Fig. 4 is an enlarged plan of the operating device as shown in Fig. 3.
Figure 5:
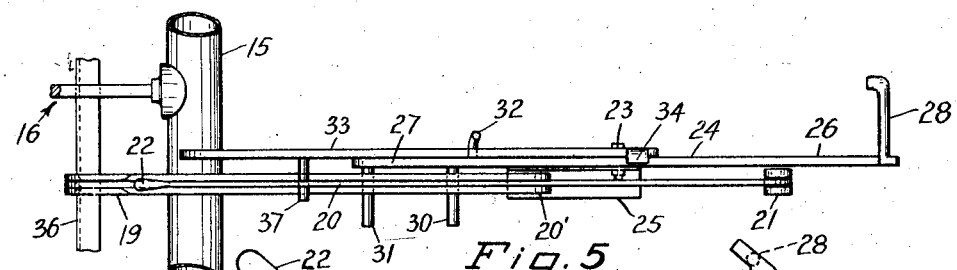
Fig. 5 is an enlarged plan of the operating device as shown in Fig. 1.
Figure 6:
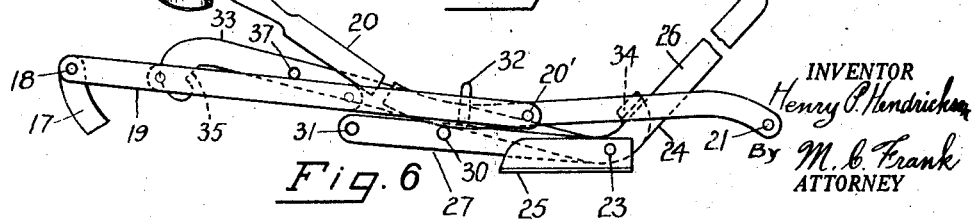
Fig. 6 shows the operating levers holding the rake locked in the raking position, the view being on the same scale as Fig. 5, and is a side elevation of the levers thereof.

When the rake is in the raking position, the members 19 and 20 form a toggle joint which locks the rake in the raking position, the formation of this toggle joint being forced by the engagement of the pin 37 with the upper edge of the arm 19, as shown in Fig. 6, and the depth of the toggle joint being ascertained by the resting of the hand lever 20 upon the pin 30, and a further downward swinging movement of the arm 27 in its turn being prevented by a stop bar 38, fixed to the frame 11, as shown in Figs. 1 and 2.

The counterbalance 39 for the rake 16, and the seat 40 provided for the driver of the rake are merely conventional contrivances shown simply for the purpose of making the invention in its operation easier to understand.

In practice, it being assumed that the rake is in the raking position and that a sufficient quantity of hay has been gathered in the rake, when the operator in his seat 40 desired to raise the rake to the dumping position, he presses with one foot upon the foothold 28 of the bell-crank lever 24 and thereby throws the lever forward. The pin 30 then first breaks the toggle joint of the members 19 and 20, thereby permitting the pin 31 to press against the member 19 with great force and causing the head 15 by means of its lateral extension 17 to be swung forward. In the meantime the member 19, swinging upward with the arm 27, impinges upon the pin 37 on the lock bar 33, thus causing the lock bar to be lifted until the rake has been swung to the dumping position shown in Fig. 2, when the hook 35 on the lock bar engages the stop member 36 on the rake 16 and thereby locks the rake in the dumping position, it being impossible for the rake to swing forward on account of the lug 34 which impinges upon the lever arm 26 when there is any tendency to such swinging movement. The rake is thus by the engagement of the hook 35 with the member 36 prevented from swinging either forward or backward and cannot be released from this engagement until the operator momentarily presses on the foot-hold 28 of the lever 26, thereby causing the member 32 on the arm 27 to strike the lock bar and to throw it up a distance sufficient for the member 36 to become disengaged from the hook 35 and thus permitting the rake to drop back to the raking position.

When the rake is swinging back to the raking position, the member 19 is pulled along by the extension 17 of the head 15 and in a moment comes in contact with and presses upon the pin 31 on the bell-crank lever arm 27, thereby carrying the bell-crank lever 24 with it backward and downward, until the bell-crank lever's downward swinging movement is arrested by the engagement of the arm 27 with the stop bar 38 on the frame 11, the bar being so located and arranged that the stopping of the arm 27 occurs when the rake is in the raking position. While the bell-crank lever 24 is swinging backward, the forward arm 26 of the lever engages the lug 34 on the lock bar 33, thereby causing the lock bar also to swing downward and the pin 37 thereon to impinge upon the member 19 so that the member 19 is forced out of alignment with the hand lever member 20 and thus forms therewith a toggle joint when the rake at the same time has been swung to the raking position. Further downward swinging movement of the arm 27 is then prevented by the engagement of the arm 27 with the stop bar 38, and straightening of the toggle joint is prevented by the engagement of the pin 37 with the member 19, while the depth of the toggle joint is determined by the engagement of the hand lever 20 with the pin 30 on the arm 27, so that the rake 16 is thus locked in the raking position.

While my invention of operating bunch rakes by foot power has been shown and described in combination with the hand lever 20, it should be understood that the hand lever is merely an auxiliary, which the operator may manipulate if he so chooses. My device will operate equally well if the hand lever is cut off, as is shown in Fig. 6, to a length only sufficient for permitting contact of the lever 20 with the pin 30 on the arm 27.

I am, of course, aware that there are in existence certain devices for raising or lowering hay rakes by foot-operated means, but I regard such devices as unsatisfactory because in those of them, where only one foot lever is provided, they require either the shifting of the operator's foot from one part of the lever to another in order to effect both rake positions, or the rake must be placed in one position by manually operated means, and in those devices where one foot lever is operated for placing the rake in one position, and another foot lever is operated for placing the rake in another position, the operation is too complicated, as is also the case with rakes in which a hand lever must be used in addition to the foot-operated means. It is readily seen that all such rakes are impractical, especially in view of the fact that the operator, beside having the raising or lowering of the rake to attend to, also has a team of horses to manage, so that he is easily liable to make a mistake in the operation of the levers and thus lose much valuable time in performing his work.

In a bunch rake of my construction, on the contrary, there is only one lever 24 to attend to, and it is unnecessary for the operator to shift his foot from its position on the foot hold 28. Furthermore, the same downward pressure on the foothold will effect the swinging of the rake either to the dumping position or to the raking position. My rake is therefore much simpler in operation than the rakes mentioned and in comparison with them saves a considerable part of the operator's time.

It should be further understood that the arrangement and the combination of parts in my device, as described and illustrated, represent merely the preferred embodiment of the invention, and that the arrangement and the combination may be changed without conflicting with the spirit of the invention, as long as the changes come within the scope of the appended claims. I wish further to emphasize that I do not claim broadly the foot-operated means in combination with manually operated means for rakes of the class above described, but what I do claim and desire to secure by Letters Patent of the United States, is:

1. In a rake adapted for hay bunching, foot-operated means for lowering the rake to raking position or for raising the rake to dumping position, said means being operable in either rake position by one foot without shifting the foot.

2. In a rake adapted for hay bunching, foot-operated means for lowering the rake to raking position or for raising the rake to dumping position; and means for locking the rake in either position, said means being operable in either rake position by one foot without shifting the foot.

3. In a rake adapted for hay bunching, foot-operated means for lowering the rake to raking position or for raising the rake to dumping position; means for locking the rake in the raking position; and other locking means for locking the rake in the dumping position, said means being operable in either rake position by one foot without shifting the foot.

4. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; and foot-operated means for actuating said members, said means being operable in either rake position by one foot without shifting the foot.

5. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members; said means being operable in either rake position by one foot without shifting the foot and means connected with the frame for limiting the movement of the foot-operated means so as to stop the rake in the raking position.

6. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; stop means attached to the rake; and means secured to the foot-operated means for engaging said stop means and holding the rake locked in the dumping position.

7. In a rake adapted for hay bunching and having a frame and an axle supported by ground wheels and being provided with a rake-supporting head pivotally mounted on the axle, a member pivotally connected with the head; a second member pivotally connected with the first mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot, means connected with the frame for limiting the movement of the foot-operated means so as to stop the rake in the raking position; stop means attached to the rake; and means secured to the foot-operated means for engaging said stop means and holding the rake locked in the dumping position.

8. In a rake adapted for hay bunching, foot-operated means for lowering the rake to raking position or for raising the rake to dumping position; said means being operable in either rake position by one foot without shifting the foot, means for locking the rake in either position; and means for releasing the locking means.

9. In a rake adapted for hay bunching, foot-operated means for lowering the rake to raking position or for raising the rake to dumping position; means for locking the rake in the raking position; means for releasing said locking means; other locking means for locking the rake in the dumping position; and means for releasing said other locking means.

10. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; and means connected with the frame for limiting the movement of the foot-operated means so as to stop the rake in the raking position, said members in the stopped position forming a toggle joint whereby the rake is locked in the raking position.

11. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; means connected with the frame for limiting the movement of the foot-operated means so as to stop the rake in the raking position, said members in the stopped position forming a toggle joint whereby the rake is locked in the raking position; and means secured to the foot-operated means for breaking the toggle joint so as to permit the raising of the rake to the dumping position by said foot-operated means.

12. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; means connected with the frame for limiting the movement of the foot-operated means so as to stop the rake in the raking position, said members in the stopped position forming a toggle joint whereby the rake is locked in the raking position; means secured to the foot-operated means for breaking the toggle joint; and other means secured to the foot-operated means for engaging said members after the breaking of the toggle joint so as to raise the rake to the dumping position by said foot-operated means.

13. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; means connected with the frame for limiting the movement of the foot-operated means so as to stop the rake in the raking position, said members in the stopped position forming a toggle joint whereby the rake is locked in the raking position; means secured to the foot-operated means for breaking the toggle joint; other means secured to the foot-operated means for engaging said members after the breaking of the toggle joint so as to raise the rake to the dumping position by said foot-operated means; stop means attached to the rake; and means secured to the foot-operated means for engaging said stop means and thereby holding the rake locked in the dumping position.

14. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; means connected with the frame for limiting the movement of the foot-operated means so as to stop the rake in the raking position, said members in the stopped position forming a toggle joint whereby the rake is locked in the raking position; and means for preventing straightening of the toggle joint while the rake is locked by the toggle joint.

15. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; means connected with the frame for limiting the movement of the foot-operated means so as to stop the rake in the raking position, said members in the stopped position forming a toggle joint whereby the rake is locked in the raking position; means for preventing straightening of the toggle joint while the rake is locked by the toggle joint; and means secured to the foot-operated means for breaking the toggle joint so as to permit the raising of the rake to the dumping position by said foot-operated means.

16. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; means connected with the frame for limiting the movement of the foot-operated means so as to stop the rake in the raking position, said members in the stopped position forming a toggle joint whereby the rake is locked in the raking position; means for preventing straightening of the toggle joint while the rake is locked by the toggle joint; means secured to the foot-operated means for breaking the toggle joint; and other means secured to the foot-operated means for engaging said members after the breaking of the toggle joint so as to raise the rake to the dumping position by said foot-operated means.

17. In a rake adapted for hay bunching and having a frame and an axle supported by ground wheels and being provided with a rake-supporting head pivotally mounted on the axle, a member pivotally connected with the head; a second member pivotally connected with the first-mentioned member and also pivotally connected with the frame, said pivotally connected members being adapted to rotate said head so as to lower the rake to raking position or to raise the rake to dumping position; foot-operated means for actuating said members, said means being operable in either rake position by one foot without shifting the foot; means connected with the frame for limiting the movement of the foot-operated means so as to stop the rake in the raking position, said members in the stopped position forming a toggle joint whereby the rake is locked in the raking position; means for preventing straightening of the toggle joint while the rake is locked by the toggle joint; means secured to the foot-operated means for breaking the toggle joint; other means secured to the foot-operated means for engaging said members after the breaking of the toggle joint so as to raise the rake to the dumping position by said foot-operated means; stop means attached to the rake; and means secured to the foot-operated means for engaging said stop means and thereby holding the rake locked in the dumping position.

In testimony whereof I affix my signature.

HENRY P. HENDRICKSON.